May 6, 1941.　　　E. C. SEWARD ET AL　　　2,240,581
APPARATUS AND METHOD FOR MANUFACTURING RUGS AND THE LIKE
Original Filed July 12, 1938
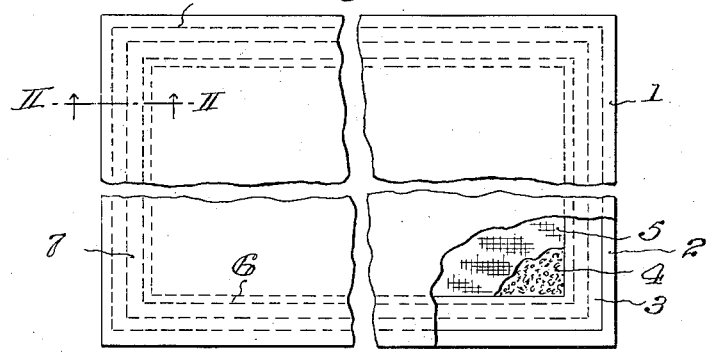
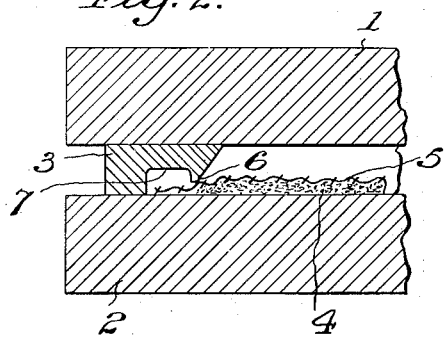
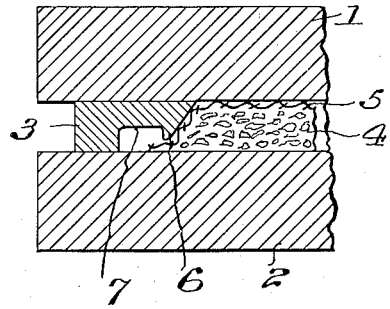
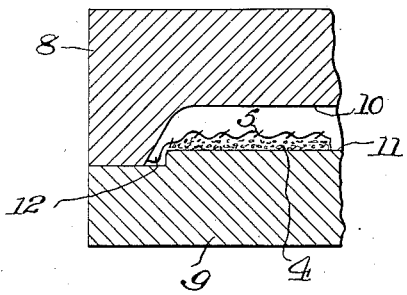
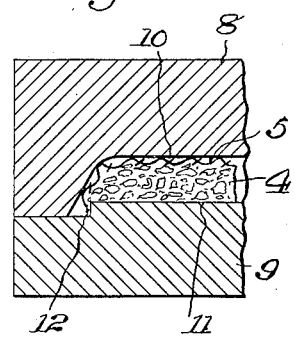
INVENTORS
Edward C. Seward
William S. Seward
BY
their ATTORNEYS Patented May 6, 1941

2,240,581

UNITED STATES PATENT OFFICE 2,240,581

APPARATUS AND METHOD FOR MANUFACTURING RUGS AND THE LIKE

Edward C. Seward, New York, N. Y., and Willard S. Seward, Summit, N. J., assignors to Sidney Blumenthal & Co. Inc., New York, N. Y., a corporation of New York Continuation of application Serial No. 218,742, July 12, 1938. This application May 10, 1940, Serial No. 334,350

4 Claims. (Cl. 18—42)

This invention relates to apparatus and method for manufacturing rugs and the like, and is more specifically directed to the production of rugs having a body of sponge rubber and a covering therefor.

An object of the invention is to provide for the manufacture of such an article whereby the expansion of the sponge rubber composition under vulcanizing heat will automatically cause the covering to conform to the top surface and edges of the rubber while being united thereto by vulcanization.

Another object consists in providing for the result just recited without causing any stretching of the covering.

Another object consists in providing for the smooth conformation of the covering to the top edges and side edges of the rubber element by a sliding or ironing action resulting from motion caused by the expansion of the rubber element under vulcanizing heat.

Another object consists in providing certain improvements in the form, construction and arrangement of the several parts, and in the steps followed, whereby the above named and other objects may effectively be attained.

This application is a continuation of application Serial No. 218,742, filed July 12, 1938.

Practical embodiments of apparatus illustrating our invention are represented in the accompanying drawing, in which—

Fig. 1 represents a broken top plan view of the apparatus and product;

Fig. 2 represents an enlarged detail vertical section taken substantially in the plane of the line II—II of Fig. 1, looking in the direction of the arrows, and showing the fabric and rubber elements before vulcanization;

Fig. 3 represents a similar view showing the fabric and rubber elements after vulcanization;

Fig. 4 represents a view similar to Fig. 2 showing a modified form; and

Fig. 5 represents a view similar to Fig. 3 showing the same modified form.

Sponge rubber is a product that is well known in the rubber industry, and there are several ways of producing it, one well known way consisting in mixing a rubber compound containing such ingredients that, upon the application of vulcanizing heat, the rubber will expand into cellular formation as it is being changed from unvulcanized rubber to vulcanized rubber. As such compounds are thoroughly known in this art, as well as the procedure for their vulcanization, it is regarded as unnecessary herein to set forth any details touching the same.

For the covering or surfacing of the article produced by our apparatus and method, we prefer to use pile fabric, but the invention is adaptable to other materials, either woven or not.

Referring to the preferred form shown in Figs. 1, 2 and 3, the apparatus consists of upper and lower mold members 1, 2 and an intermediate member 3. These members may suitably be composed of metal, such as cast iron or steel, and they may be adapted for insertion between the hot plates of a vulcanizing press, or into the steam chest of an open vulcanizer or may be, themselves, chambered for the circulation of steam or the like. All this is well within the knowledge and skill of the practising art, and calls for no further description.

Assuming that a rug is to be manufactured, the mold member 3 will be of substantially the size and outline desired for the finished product, and the mold members 1 and 2 may conveniently take a similar, but somewhat larger, form.

In practice, a layer of sponge rubber compound, denoted by 4, is laid upon the member 2, and covered by a layer of finishing material, such as pile fabric, which is conventionally represented in the drawing and marked 5.

It will be noted that the mold member 3 is formed in cross section so as to have a downwardly projecting rib 6 and a channel 7. This member is next set upon the mold member 2 with the rib 6 in vertical alinement with the edge of the rubber layer 4, and with the edge of the fabric 5 extending beyond the rib 6 and into channel 7. The member 1 is then placed in position to clamp the member 3 upon the member 2, and the assembly is subjected to vulcanizing heat.

The action of the heat causes the sponge rubber layer 4 to expand and to carry with it the fabric 5 into substantially the form and position shown in Fig. 3. This expanding action of the rubber will drag or slide the fabric along the lower extremity of the rib 6 so as to smooth or iron it down along the edges of the rubber layer, as shown in Fig. 3. The effect of the heat will also cause the rubber and fabric to be firmly united by vulcanization, and the rubber itself to change from unvulcanized rubber to vulcanized rubber.

The mold members may then be separated, the vulcanized product removed, and the excess fabric around the periphery thereof carefully trimmed off to provide a neat edge.

It is preferable to insure that the rubber layer 4 placed upon the mold member 2 is not of such size as to extend beyond the rib 6 into the channel 7 because, if there is any substantial amount of rubber in this location, it has a tendency to swell up within the channel and, so to speak, trap the edge of the fabric therein, which might result in stretching of the fabric during the vulcanization step. It is accordingly safest to cut the rubber layer 4 slightly smaller in area than the area circumscribed by the rib 6. Avoidance of any substantial stretching of the fabric element is particularly important when pile fabric is being used, as stitching tends to separate the pile elements and to cause the ground of the pile fabric to show therethrough. This is especially noticeable on any edges around which the fabric is bent, and presents an unsightly and undesirable appearance.

The modified form shown in Figs. 4 and 5 is composed of only two mold members, the upper of which is marked 8 and the lower 9. In this form, the upper mold member is chambered as indicated at 10 to mold the upper and edge outline of the desired product. The lower mold member has an elevated portion 11 which is of somewhat less area than the lower periphery of chamber 10, so as to leave a peripheral groove 12 therebetween when the members are assembled.

In operating with this modified form, the sponge rubber layer is cut to conform in area to the portion 11 and laid thereupon. The fabric is laid on the rubber with its edges projecting down into groove 12. The mold member 8 is then placed in position upon the mold member 9 and the assembly submitted to vulcanizing heat.

Under the influence of heat the rubber and fabric elements will take the position and form indicated in Fig. 5, from which it will be noted that both rubber and fabric extend down into groove 12. The expansion action of the rubber during vulcanization smooths or irons the fabric down along the edges of the rubber by moving it in sliding frictional contact with the adjacent wall of chamber 10 (rather than by edge contact as with part 6 in the preferred form), so that any extension of rubber into the groove does not have quite the "trapping" action which has been noted as undesirable in describing the other form.

After vulcanization is completed, the mold members 8 and 9 are separated, the product removed, and the excess rubber and fabric edges cut off along the line of the portion 11 of mold member 9, so that the edges do not project below the main bottom of the product, and a neat finish is imparted.

While we have represented the mold members here as being rectangular in plan, it will be understood that they may be made in any form or size according to the product desired; and that, instead of making rugs, we may make other articles to which the process and apparatus are adaptable such, for instance, as cushions or cushioning elements for furniture, vehicles, etc. Furthermore, it will be clear that the mold element 3 in the preferred form of the invention, could be secured to or formed integral with mold element 1, in order to constitute in effect a single upper mold member, if that form of construction should be desired.

It will also be understood that various changes may be resorted to in the form, construction and arrangement of the parts, and in the steps followed, as well as in the materials used, without departing from the spirit and scope of our invention, and hence we do not intend to be limited to the details herein set forth, except as they may be included in the claims.

What we claim is:

1. Apparatus of the character described comprising, mold members fitted to enclose and vulcanize an article composed of heat expansible rubber and a fabric covering therefor, one of said members being substantially flat to mold the rubber side of the article, the other member being formed to mold the fabric side of the article, and the last named member having a portion extending toward but not contacting the first named member to iron down the fabric covering on the marginal portions of the rubber as the latter expands under the influence of heat and generates a sliding movement between the fabric and said extending portion.

2. Apparatus for manufacturing rugs or the like composed of heat expanded vulcanized rubber and a fabric covering therefor comprising, mold members forming when in operative position a cavity for shaping and vulcanizing the article and a peripheral channel communicating with and surrounding said cavity, said members being in contact only at an area surrounding and spaced outwardly from said channel and being designed to cooperate with means for holding them in operative position against relative movement during the shaping and vulcanizing of the article, said cavity and channel being defined by a part of a mold member which extends toward but does not contact the other mold member when in oeprative position, whereby the rubber may be disposed in said cavity and the fabric may be disposed in said cavity and channel with its edges free to be drawn from the channel into the cavity while moving in sliding contact with a part of a mold member under the influence of the expansion of the rubber with the result of conforming the edges of the fabric to the edges of the rubber.

3. Apparatus of the character described comprising, mold members fitted to enclose and vulcanize an article composed of heat expansible rubber and a fabric covering therefor, one of said members being substantially flat to mold the rubber side of the article, the other member being formed to mold the fabric side of the article and having a projecting portion shaped to define the periphery of the article and a projecting portion spaced outwardly from said first named portion and adapted to bear directly against said flat mold member to determine the spacing of the mold members when in operative position, the first named projecting portion being arranged to extend toward the flat mold member without touching it and to leave a space as great as the thickness of the fabric, the space between said projecting portions constituting a peripheral channel adapted to receive loosely the margins of the fabric.

4. A method of manufacturing rugs or the like including, associating a layer of heat expansible vulcanizable rubber with a fabric covering therefor on a member of a shaping and vulcanizing mold, placing another mold member in operative position with respect to the first named member and to the rubber and fabric without gripping the fabric, holding the said mold members in operative position and against relative movement, applying heat to expand and vulcanize the rubber, and causing the expansion of the rubber to move the portion of the fabric adjacent its edges in sliding contact with a part of a mold member positioned to define the periphery of the finished article for smoothing the said portion of the fabric onto the edges of the rubber and securing it thereto while the remainder of the rubber is shaped and secured to the fabric by pressure against a part of a mold member within said periphery.

EDWARD C. SEWARD.
WILLARD S. SEWARD.